US010336222B2

United States Patent
Jensen et al.

(10) Patent No.: US 10,336,222 B2
(45) Date of Patent: Jul. 2, 2019

(54) STOW-IN-FLOOR SEAT ASSEMBLY WITH PITCHED EASY ENTRY POSITION

(71) Applicant: Magna Seating Inc, Aurora (CA)

(72) Inventors: Nathan A. Jensen, Rochester, MI (US); Prasad D. Jagtap, Farmington, MI (US); Alan Proulx, Commerce Township, MI (US); Timothy Jon Brush, Waterford, MI (US); Senthil Kumar Chinnadurai, Farmington Hills, MI (US); Abhishek Kedia, Farmington Hills, MI (US); Umesh Prakash Handigol, Farmington, MI (US); Jeffrey P. Carroll, West Bloomfield, MI (US); Lyle Dadd, Brighton, MI (US); Omar D. Tame, West Bloomfield, MI (US); Robert Thomas Coffey, Canton, MI (US); Avery Folk, Farmington Hills, MI (US); Ravindra Thamake, Farmington Hills, MI (US)

(73) Assignee: Magna Seating Inc, Aurora, Ontario (CA)

( * ) Notice: Subject to any disclaimer, the term of this patent is extended or adjusted under 35 U.S.C. 154(b) by 43 days.

(21) Appl. No.: 15/631,218

(22) Filed: Jun. 23, 2017

(65) Prior Publication Data

US 2017/0368966 A1   Dec. 28, 2017

Related U.S. Application Data

(60) Provisional application No. 62/353,593, filed on Jun. 23, 2016.

(51) Int. Cl.
*B60N 2/30* (2006.01)
*B60N 2/22* (2006.01)
*B60N 2/874* (2018.01)

(52) U.S. Cl.
CPC ............ *B60N 2/3075* (2013.01); *B60N 2/22* (2013.01); *B60N 2/309* (2013.01); *B60N 2/3011* (2013.01); *B60N 2/3065* (2013.01); *B60N 2/874* (2018.02)

(58) Field of Classification Search
CPC ... B60N 2/3075; B60N 2/3079; B60N 2/3072
See application file for complete search history.

(56) References Cited

U.S. PATENT DOCUMENTS

| 5,527,087 | A | * | 6/1996 | Takeda | B60N 2/2352 |
| | | | | | 297/15 |
| 5,588,707 | A | * | 12/1996 | Bolsworth | B60N 2/3013 |
| | | | | | 296/66 |

(Continued)

FOREIGN PATENT DOCUMENTS

| CA | 2835944 A1 * | 12/2012 | ............ B60N 2/3011 |
| EP | 1964712 A1 * | 9/2008 | ............ B60N 2/3011 |

(Continued)

*Primary Examiner* — Timothy J Brindley
(74) *Attorney, Agent, or Firm* — Miller Canfield

(57) ABSTRACT

A seat is provided in which a seat cushion is pivotally coupled to a seat back by a recliner assembly. The recliner assembly is selectively operable between a locked condition preventing pivotal movement of the seat back and an unlocked condition allowing pivotal movement of the seat back. A riser assembly supports the seat assembly above a floor, such as the floor of a vehicle, and is configured for actuation and movement of the seat assembly between a generally upright seating position, a pitched easy entry position tilted forwardly and downwardly towards the floor to allow easier ingress and egress behind the seat, and a stowed position recessed within a compartment below the floor.

10 Claims, 19 Drawing Sheets

(56) References Cited

U.S. PATENT DOCUMENTS

| | | | |
|---|---|---|---|
| 6,293,603 B1 * | 9/2001 | Waku | B60N 2/3011 296/65.05 |
| 7,134,725 B2 | 11/2006 | Hofmann et al. | |
| 7,255,384 B2 | 8/2007 | Saberan et al. | |
| 7,585,011 B2 * | 9/2009 | Kuroki | B60N 2/3011 296/65.09 |
| 7,850,220 B2 | 12/2010 | Holdampf | |
| 8,485,583 B2 | 7/2013 | Mather et al. | |
| 8,632,113 B2 | 1/2014 | Mather et al. | |
| 8,651,550 B2 * | 2/2014 | Mather | B60N 2/3075 296/37.14 |
| 8,708,393 B2 | 4/2014 | Mather et al. | |
| 9,302,600 B2 | 4/2016 | Zeimis, III et al. | |
| 2003/0071492 A1 * | 4/2003 | Watanabe | B60N 2/206 297/15 |
| 2005/0116522 A1 | 6/2005 | Holdampf | |
| 2006/0097538 A1 * | 5/2006 | Villeminey | B60N 2/3011 296/65.09 |
| 2006/0267366 A1 * | 11/2006 | Seibold | B60N 2/3065 296/65.05 |
| 2007/0096496 A1 * | 5/2007 | Saberan | B60N 2/045 296/65.09 |
| 2007/0210601 A1 * | 9/2007 | Phillips | B60N 2/3011 296/37.14 |
| 2008/0203772 A1 * | 8/2008 | Holdampf | B60N 2/3011 297/15 |
| 2011/0316317 A1 * | 12/2011 | Sprenger | B60N 2/206 297/344.1 |
| 2013/0062903 A1 * | 3/2013 | Mather | B60N 2/2356 296/64 |
| 2014/0015273 A1 * | 1/2014 | Sawada | B60N 2/3011 296/65.09 |
| 2014/0239662 A1 * | 8/2014 | Kim | B60N 2/3031 296/65.05 |

FOREIGN PATENT DOCUMENTS

| | | | | |
|---|---|---|---|---|
| JP | 2004262293 A | * | 9/2004 | B60N 2/3011 |
| JP | 2009227157 A | * | 10/2009 | B60N 2/01583 |
| WO | 2010125677 | | 11/2010 | |
| WO | WO-2014171454 A1 | * | 10/2014 | B60N 2/01583 |
| WO | WO-2015098040 A1 | * | 7/2015 | B60N 2/68 |
| WO | WO-2015098042 A1 | * | 7/2015 | B60N 2/3013 |

* cited by examiner

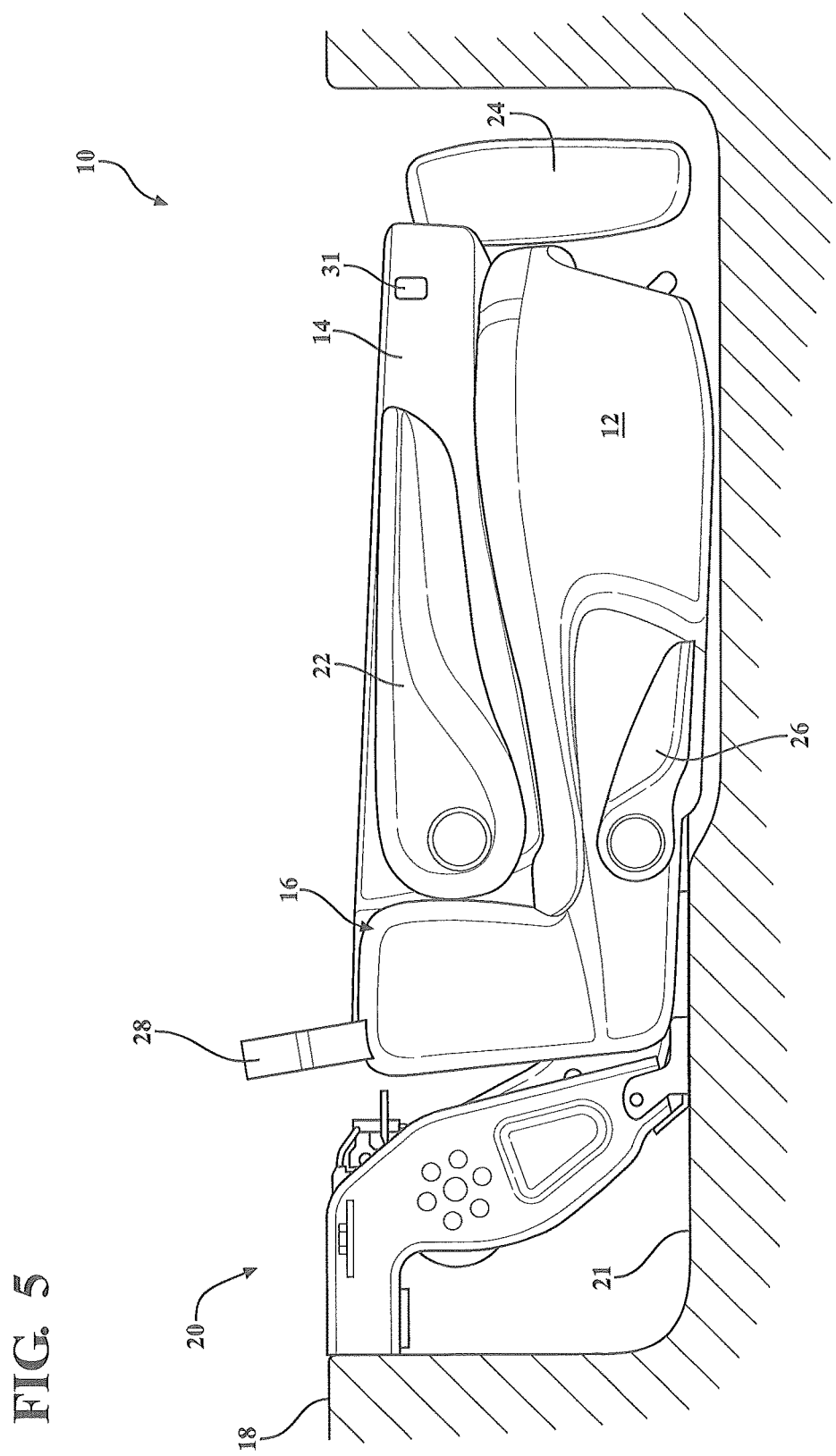

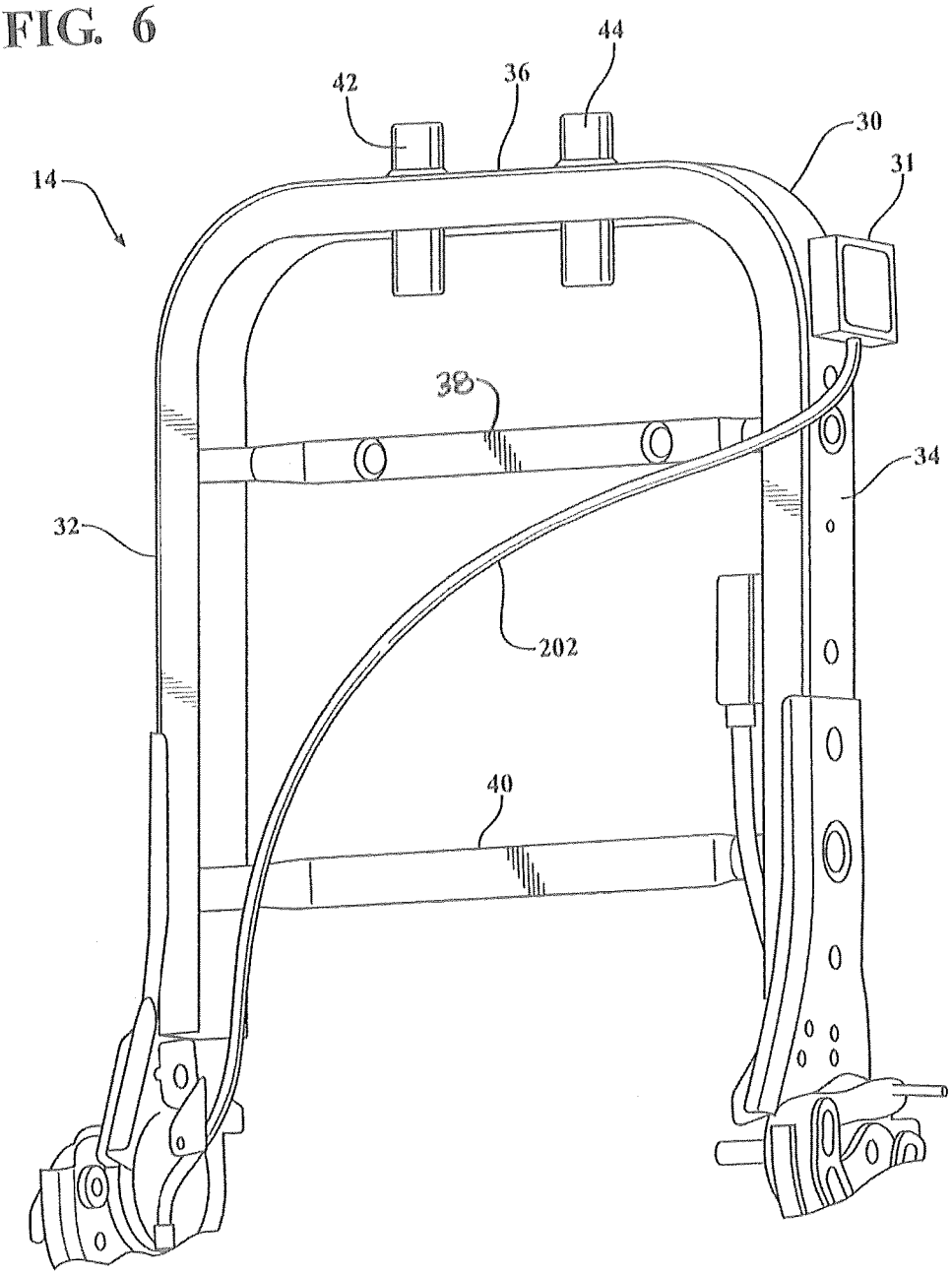

STOW-IN-FLOOR SEAT ASSEMBLY WITH PITCHED EASY ENTRY POSITION

CROSS-REFERENCE TO RELATED APPLICATIONS

This application claims priority to U.S. Provisional Application No. 62/353,593 filed on Jun. 23, 2016.

BACKGROUND OF THE INVENTION

1. Field of the Invention

The invention relates to a seat assembly for an automotive vehicle, and more particularly, to a stow-in-floor seat assembly operable between a generally upright seating position, a pitched easy entry position tilted forwardly for allowing easier ingress and egress into the rear of the vehicle, and a stowed position recessed within the floor of the automotive vehicle.

2. Description of Related Art

Automotive vehicles include seat assemblies for supporting occupants within the vehicle. The seat assemblies typically include a seat cushion and a seat back operatively coupled to the seat cushion by a recliner mechanism for allowing selective pivotal adjustment of the seat back relative to the seat cushion between a plurality of reclined seating positions. The seat back is also commonly moveable between any one of the reclined seating positions and a generally horizontal fold flat position overlying the seat cushion to present a load floor surface on the rear surface of the seat back.

It is also known in the automotive seating art to mount a riser assembly between the seat cushion and the floor of the vehicle for moving the seat assembly between a seating position, with the seat back in one of the reclined seating positions and the seat cushion spaced above the floor, and a stowed position, with the seat back in the fold flat position and the seat assembly stowed within a recess or bin in the floor of the vehicle. The seat assembly typically includes a first release mechanism for actuating the recliner mechanism to provide pivotal movement of the seat back between the reclined seating position and the fold flat position and a separate second release mechanism for actuating the riser assembly to provide pivotal movement of the seat assembly between the seating position and the stowed position.

It is desirable to provide a release mechanism operatively coupled to the riser assembly for providing movement of the seat assembly between the seating position or fold flat position and a pitched easy entry position wherein the seat assembly is tilted forwardly and downwardly towards the floor of the vehicle to allow easier ingress and egress into the rear of the vehicle.

SUMMARY OF THE INVENTION

An exemplary embodiment of the disclosure involves a seat comprising a seat assembly and a riser assembly. The seat assembly includes a seat cushion pivotally coupled to a seat back by a recliner assembly. The recliner assembly is selectively operable between a locked condition preventing pivotal movement of the seat back and an unlocked condition allowing pivotal movement of the seat back. The riser assembly supports the seat assembly above a floor, such as the floor of a vehicle, and is configured for actuation and movement of the seat assembly between a generally upright seating position, a pitched easy entry position tilted forwardly and downwardly towards the floor to allow easier ingress and egress behind the seat, and a stowed position recessed within a compartment below the floor.

In an embodiment, the recliner assembly comprises a locking mechanism, such as a disc recliner, which is operatively coupled to a cam lever. The first end of the cam lever is operatively coupled to at least one recline link. The at least one recline link is in turn operatively coupled to a recline handle for operation by the user. Operation of the recline handle thereby moves the at least one recline link, which in turn rotates the cam lever and unlocks the locking mechanism, so as to permit the recliner assembly to enter the unlocked condition. In the unlocked condition, the seat back may be pivoted between at least two of an upright seating position, a reclined seating position, and a fold flat position.

In an embodiment, the second end of the cam lever is operatively coupled to at least one further recline link. The at least one further recline link is in turn operatively coupled to a recliner strap for operation by the user. Pulling the recliner strap thereby moves the at least one further recline link, which in turn rotates the cam lever and unlocks the locking mechanism, so as to permit the recliner assembly to enter the unlocked condition.

In an embodiment, operation of the recliner strap may also unlock a further locking mechanism on the riser assembly. The further locking mechanism pivotally couples support brackets attached to the floor of the vehicle to a pair of rear legs connecting the riser assembly to the seat assembly. The further locking mechanism is operatively coupled to an electric drive assembly, which moves the further locking mechanism into the unlocked position in response to a proximity switch. The proximity switch is activated by a switch actuator that is operatively coupled (e.g. by a cable, cam, linkage, or otherwise) to the at least one further recline link, which is in turn operatively coupled to the recliner strap. In such embodiments, operation of the recliner strap thereby unlocks the further locking mechanism on the riser assembly, in addition to the locking mechanism on the seat assembly, so as to permit the seat to be moved to a pitched easy entry position in which the seat back is in a fold flat position.

In an embodiment, an easy entry handle is operatively coupled to the seat assembly. The easy entry handle is operatively coupled to the switch actuator (e.g. by a cable, cam, linkage, or otherwise). Operation of the easy entry handle moves the switch actuator, thereby triggering the proximity switch and unlocking the further locking mechanism on the riser assembly. The locking mechanism on the seat assembly remains in its locked condition, allowing the seat to be moved to the pitched easy entry position in which the seat back is in a generally upright position.

In an embodiment, the switch actuator is also operatively coupled (e.g. by a cable, cam, linkage, or otherwise) to at least one biased latch mechanism on the riser assembly. The latch mechanism pivotally couples an upper and lower portion of the front legs of the riser assembly. The latch mechanism is configured to lock the riser assembly in the upright position. In such embodiments, movement of the switch actuator (using the recliner strap or the easy entry handle) also moves the latch mechanism against its bias, thereby allowing the riser assembly to leave the upright position so as to permit the seat to enter the pitched easy entry position or the stowed position (as the case may be).

In an embodiment, the seat assembly further comprises a seat back blocking mechanism. The seat back blocking mechanism comprises a biased pin that enters an aperture on the recliner assembly to block and prevent the seat back from pivoting forward to the fold flat position when the seat assembly is in the pitched easy entry position. The pin is operatively coupled to the riser assembly (e.g. by a cable, cam, linkage, or otherwise) such that the pin moves against the bias and permits movement into the fold flat position when the riser assembly moves beyond the pitched easy entry position, toward the stowed position.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 5 is a side view of the seat assembly and the riser assembly, in a stowed position.

FIG. 6 is a perspective view of a seat back frame according to an embodiment of the disclosure.

DETAILED DESCRIPTION OF THE EMBODIMENTS

Figure 1:
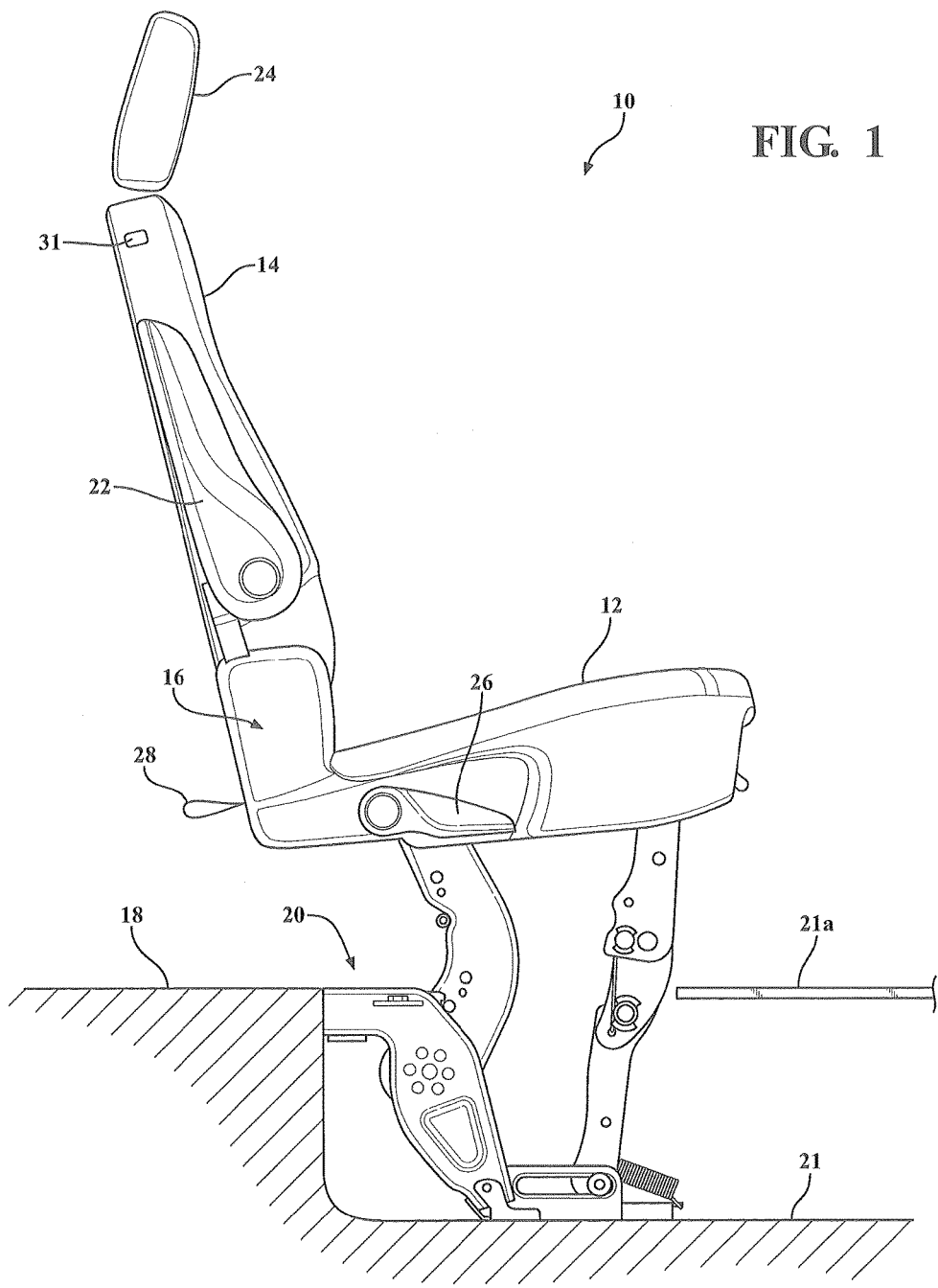
FIG. 1 is a side view of a seat assembly and riser assembly according to an embodiment of the disclosure.
Figure 2:
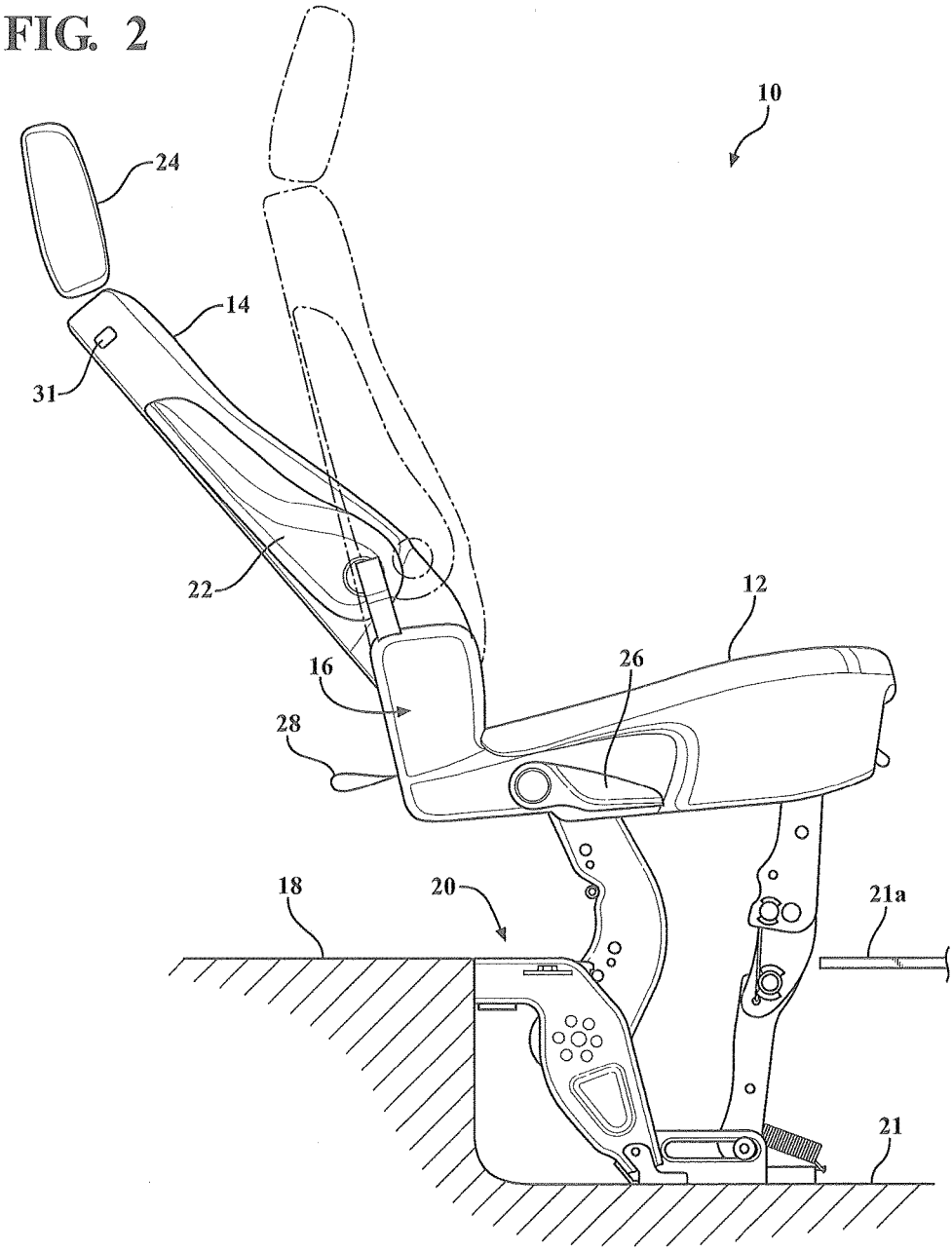
FIG. 2 is a side view of the seat assembly and riser assembly, illustrating a reclined seating position.
Figure 3:
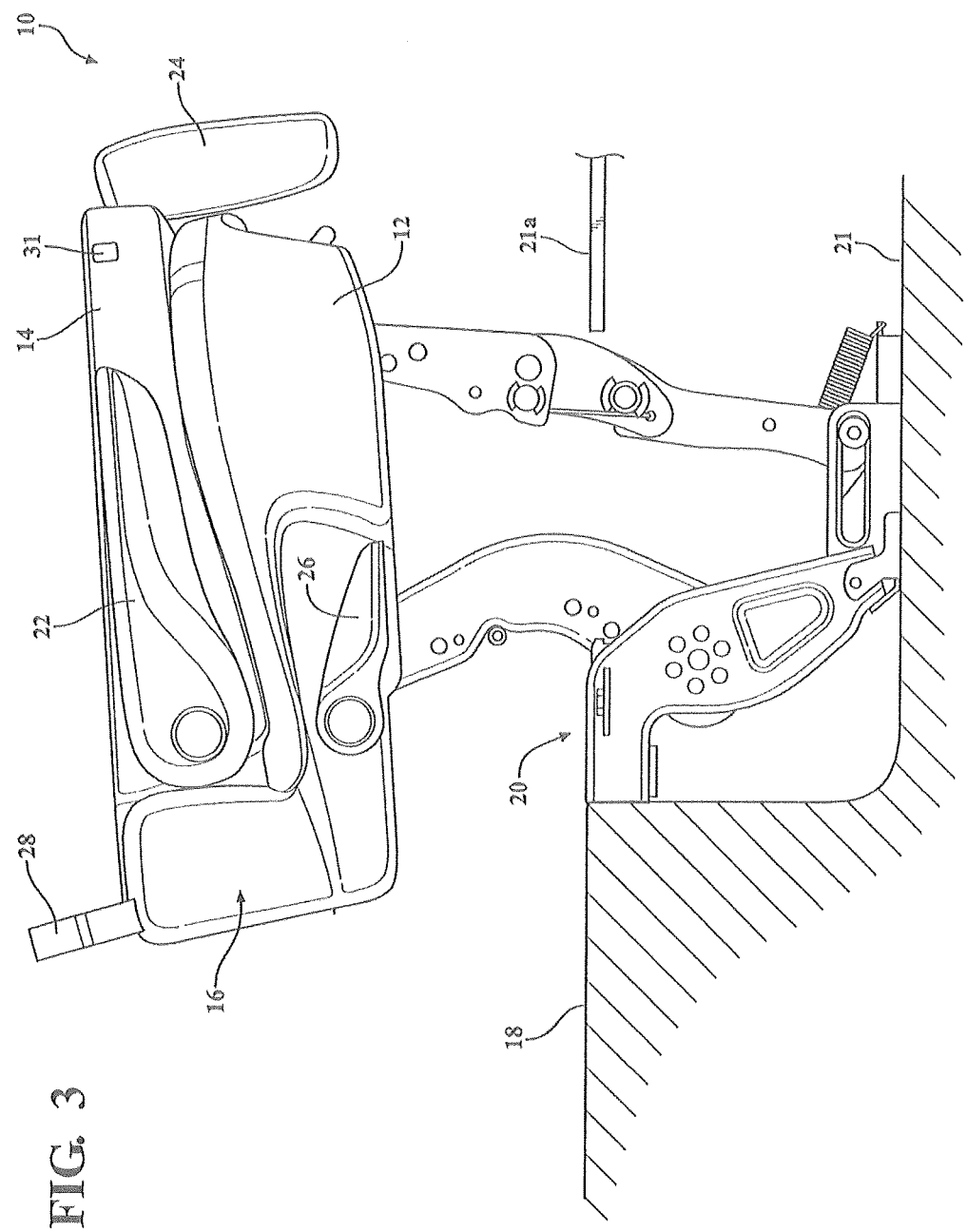
FIG. 3 is a side view of the seat assembly and riser assembly, in a fold flat position.
Figure 4A:
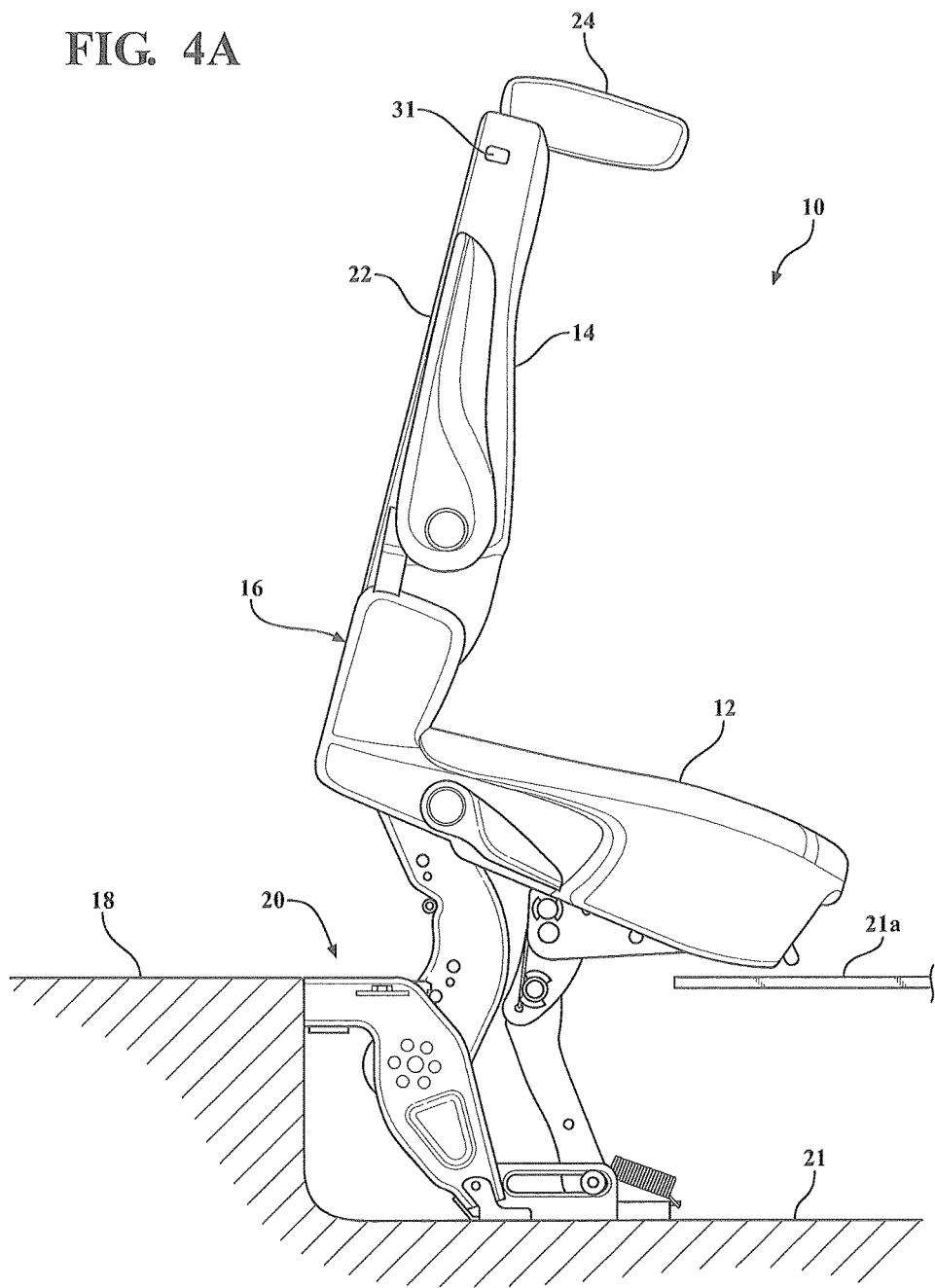
FIG. 4A is a side view of the seat assembly and the riser assembly, in a pitched easy entry position, with the seat back configured in an upright position.
Figure 4B:
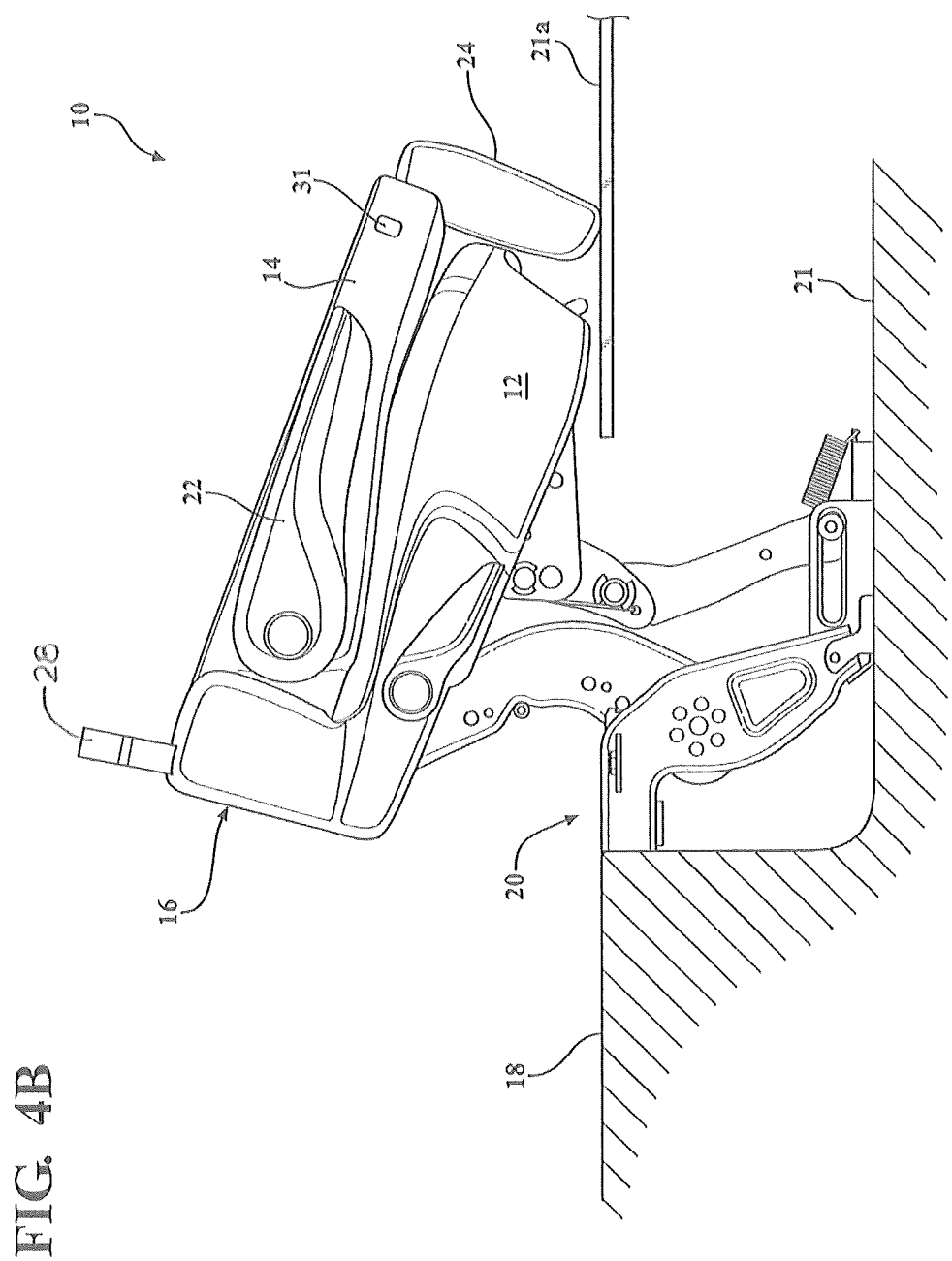
FIG. 4B is a side view of the seat assembly and the riser assembly, in a pitched easy entry position, with the seat configured in a fold flat position.

Referring to the Figures, wherein like numerals indicate like or corresponding parts throughout the several views, a seat assembly according to one embodiment of the invention for use in an automotive vehicle is generally shown at 10. Referring to FIG. 1, the seat assembly 10 includes a generally horizontal seat cushion 12 and a generally upright seat back 14 pivotally coupled to the seat cushion 12 by a pair of recliner assemblies 16. The recliner assembly 16 is selectively operable between a locked condition preventing pivotal movement of the seat back 14 and an unlocked condition allowing pivotal movement of the seat back 14 relative to the seat cushion 12 between an upright seating position (shown in FIG. 1), a plurality of reclined seating positions (shown in FIG. 2), and a forwardly pivoted fold flat position overlying the seat cushion 12 (shown in FIG. 3). The recliner assembly 16 may be any suitable recliner assembly that is well known in the art, such as a disc-type recliner. The seat assembly 10 is operatively coupled to and supported above a floor 18 in the vehicle by a riser assembly 20. The riser assembly 20 provides for actuation and movement of the seat assembly 10 between one of the seating positions spaced above the floor 18 of the vehicle as shown in FIGS. 1 and 2, a pitched easy entry position tilted forwardly and downwardly towards the floor 18 of the vehicle to allow easier ingress and egress into the rear of the vehicle, as shown in FIGS. 4a and 4b, and a stowed position recessed within a bin 21 or compartment below the floor 18 of the vehicle, as shown in FIG. 5. The seat assembly 10 may also include a pair of armrests 22 pivotally coupled to each opposing side of the seat back 14 for supporting a seat occupant's arm in a comfort position and a head restraint 24 operatively coupled to the top portion of the seat back 14 and adjustable between a stowed position and a use position for supporting the head and neck of the seat occupant as is commonly known in the art.

Referring to FIG. 6, the seat back 14 includes a generally U-shaped seat back frame 30 for supporting a cellular foam pad encased in a trim cover as is commonly known in the art. The seat back frame 30 is defined by spaced apart first and second side members 32, 34 extending vertically between first ends interconnected by a top cross member 36 and opposite distal second ends for connection to the recliner assembly 16. A pair of mid cross members 38, 40 also extend laterally between and interconnect the side members 32, 34. A pair of head restraint tubes 42, 44 may extend through the top cross member 36 for slidably receiving and supporting a pair of guide posts (not shown) of the head restraint 24 as is commonly known in the seating art.

Figure 7:
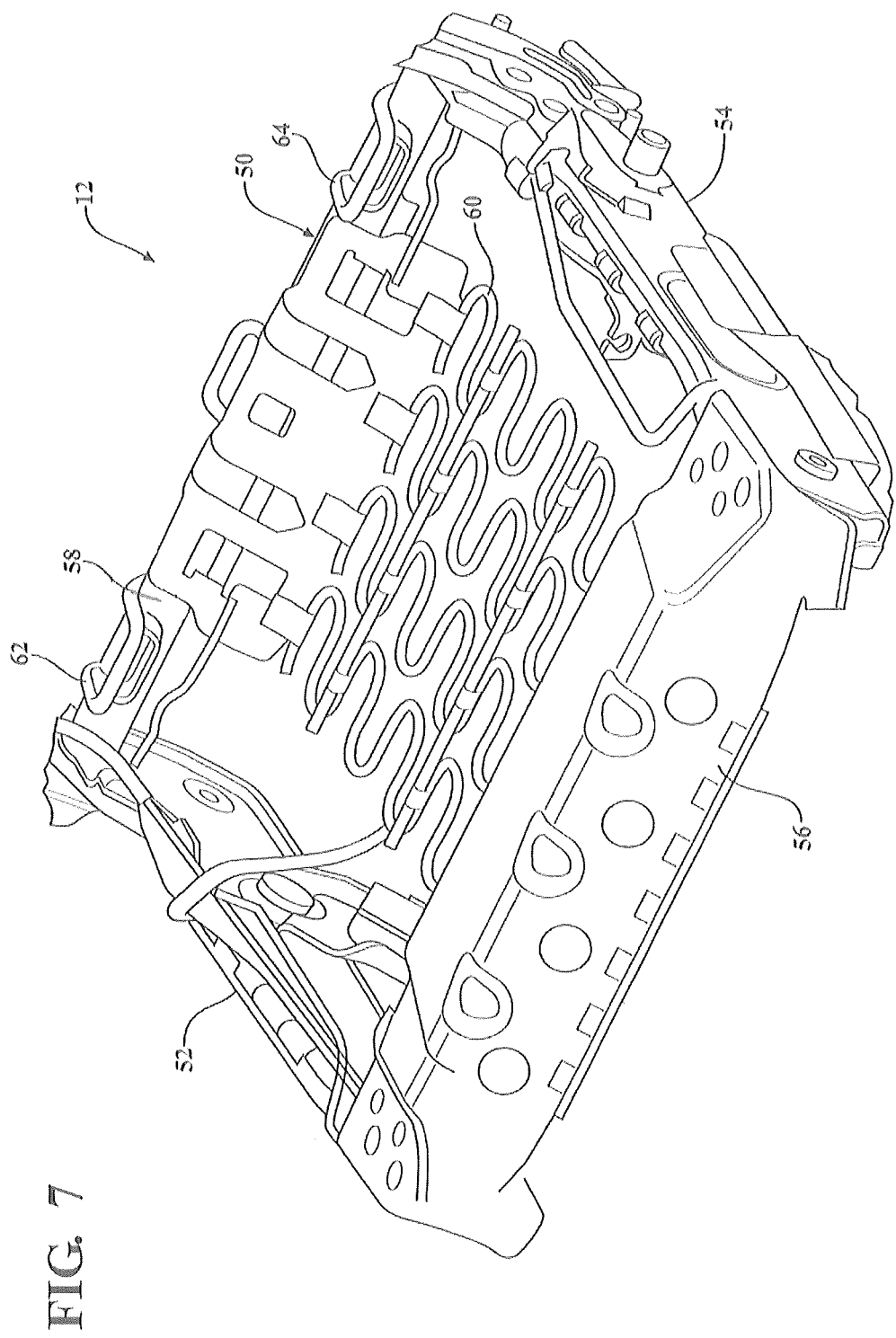
FIG. 7 is a perspective view of a seat cushion frame according to an embodiment of the disclosure.

Referring to FIG. 7, the seat cushion 12 similarly includes a seat cushion frame 50 for supporting a cellular foam pad encased in a trim cover. The seat cushion frame 50 is defined by spaced apart first and second side members 52, 54 extending between first ends interconnected by a front cross member 56 and opposite second ends interconnected by a rear cross member 58. A sinusoidal spring suspension mat 60 extends between the front and rear cross members 56, 58 for providing seat occupant comfort and support as is commonly known in the art. The rear cross member 58 may also include a pair of child seat latch wires 62, 64 extending therefrom for receiving and securing a child seat on the seat cushion 12 as is commonly known in the seating art.

Figure 8:
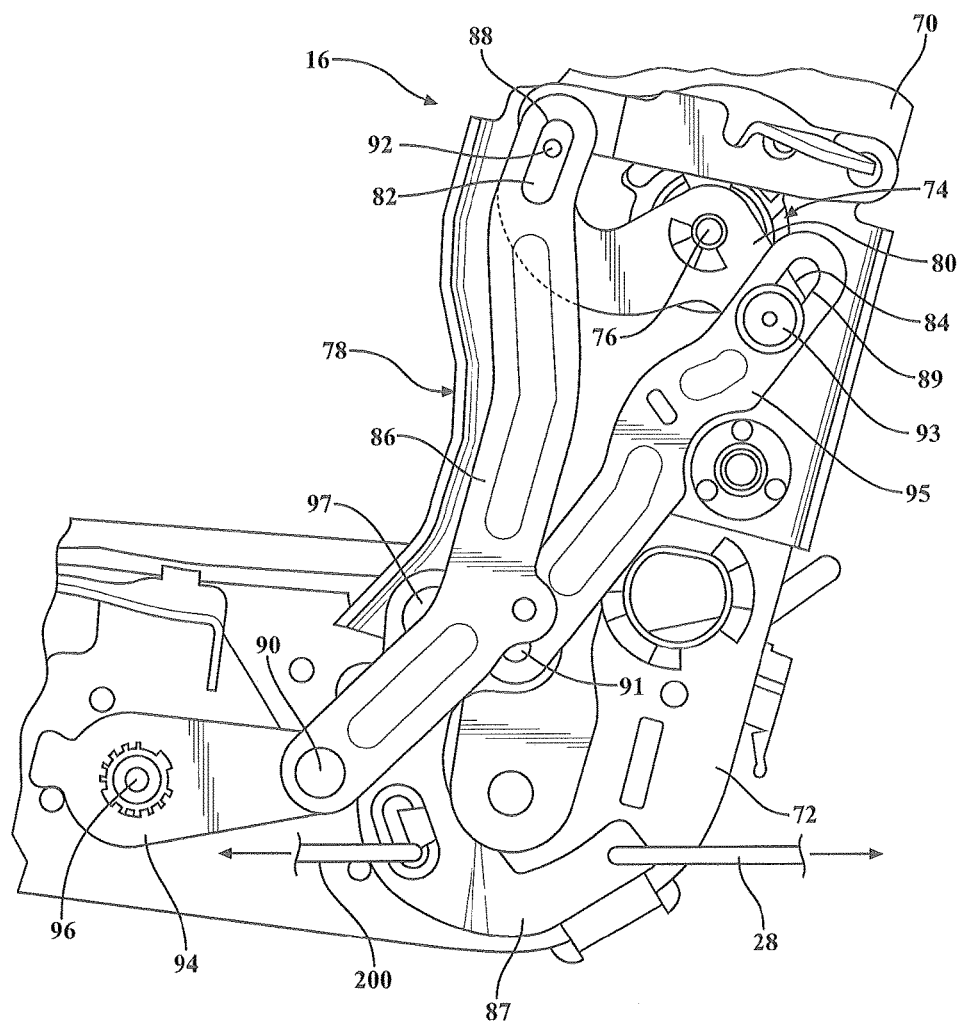
FIG. 8 is a fragmentary outboard side view of a recliner assembly according to an embodiment of the disclosure.
Figure 9A:
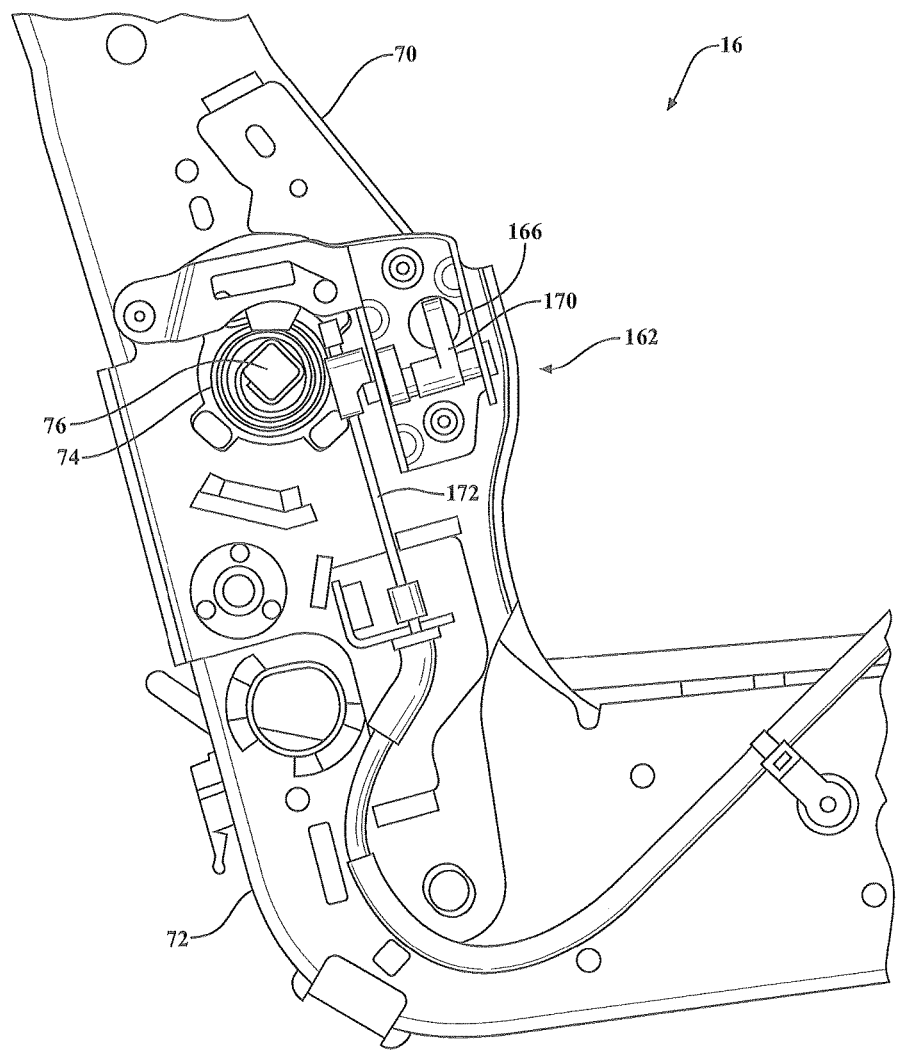
FIG. 9A is a fragmentary inboard side view of a recliner assembly according to an embodiment of the disclosure.
Figure 9B:
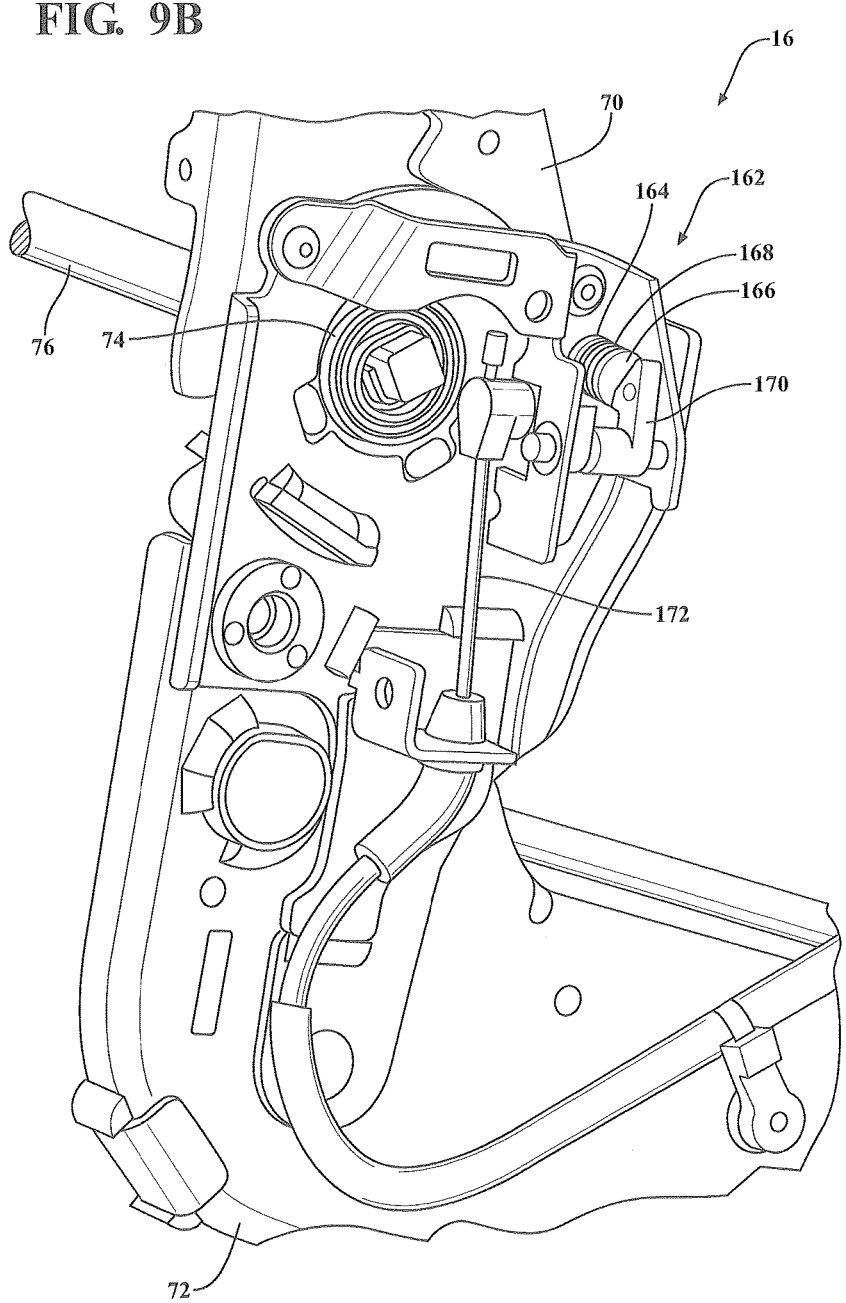
FIG. 9B is a fragmentary perspective view of a recliner assembly according to an embodiment of the disclosure.

Referring to FIG. 8, the recliner assembly 16 is shown pivotally coupling the seat back 14 to the seat cushion 12. A recliner assembly 16 is operatively coupled to each side of the seat assembly 10. That is, a first recliner assembly 16 is mounted on the inboard side of the seat assembly 10 between the seat back frame 30 and the seat cushion frame 50 and a second recliner assembly 16 is mounted on the outboard side of the seat assembly 10 between the seat back frame 30 and the seat cushion frame 50. Each recliner assembly 16 includes an upper bracket 70 fixedly mounted to the side member 32, 34 of the seat back frame 30 and a lower bracket 72 fixedly mounted to the side member 52, 54 of the seat cushion frame 50. A first disc recliner 74, of the type commonly known in the seating art, is operatively coupled between the upper bracket 70 and lower bracket 72. A cross tube 76 is coupled between the disc recliner 74 on the inboard side of the seat assembly 10 and the disc recliner 74 on the outboard side of the seat assembly 10 for synchronizing actuation of the disc recliners 74 between a locked condition preventing pivotal movement of the seat back 14 relative to the seat cushion 12 and an unlocked condition allowing pivotal movement of the seat back 14 between the seating position, a reclined position and the fold flat position. A recline release mechanism 78 is operatively coupled to one of the disc recliners 74 for simultaneously actuating both of the disc recliners 74 between the locked and unlocked conditions. More specifically, the recline release mechanism 78 includes a cam lever 80 fixedly secured to and extending from one of the disc recliners 74, the cam lever 80 having a first lever end 82 and an opposite second lever end 84. A first recline link 86 extends between a first end defined by an elongated slot 88 and an opposite second end defined by a pivot pin 90. A guide pin 92 extends from the first lever end 82 and is slidably received in the slot 88 of the first recline link 86. A second recline link 94 includes a first end pivotally connected to the side member 54 of the seat cushion frame 50 by a pivot post 96 and an opposite distal end pivotally connected to the first recline link 86 by pivot pin 90. A recliner handle (shown at 26 in FIG. 1) is secured to the pivot post 96 for pivoting the second recline link 94 and actuating the disc recliner 74 between the locked and unlocked condition. In operation, actuation of the recliner handle 26 pivots the second recline link 94 about pivot post 96 in the clockwise direction, as shown in FIG. 8, pulling downwardly on the first recline link 86. The first recline link 86 pulls on the guide pin 92 to pivot the cam lever 80 in the counterclockwise direction, thereby releasing the disc recliner 74 to the unlocked condition and allowing pivotal movement of the seat back 14 relative to the seat cushion 12.

The recliner assembly 16 may also be actuated between the locked and unlocked conditions by a rear recliner strap 28. The rear recliner strap 28 is connected to a third recline link 87 which is pivotally coupled to the lower bracket 72 by pivot post 97 arranged between a first end connected to the recliner strap 28 and an opposite second end defined by pivot pin 91. A fourth recline link 95 extends between a first end pivotally coupled to the third recline link 87 by pivot pin 91 and an opposite second end having an elongated slot 89 therein for slidably receiving a second guide pin 93 extending from the second lever end 84 of the cam lever 80. In operation, as the rear recliner strap 28 is pulled rearwardly, the third recline link 87 pivots in the counterclockwise direction pushing upwardly on the fourth recline link 95. The fourth recline link 95 rotates the cam lever 80 in the counterclockwise direction, thereby releasing the disc recliner 74 from the locked to unlocked condition allowing pivotal movement of the seat back 14 from one of the reclined seating positions to the fold flat position.

Figure 10:
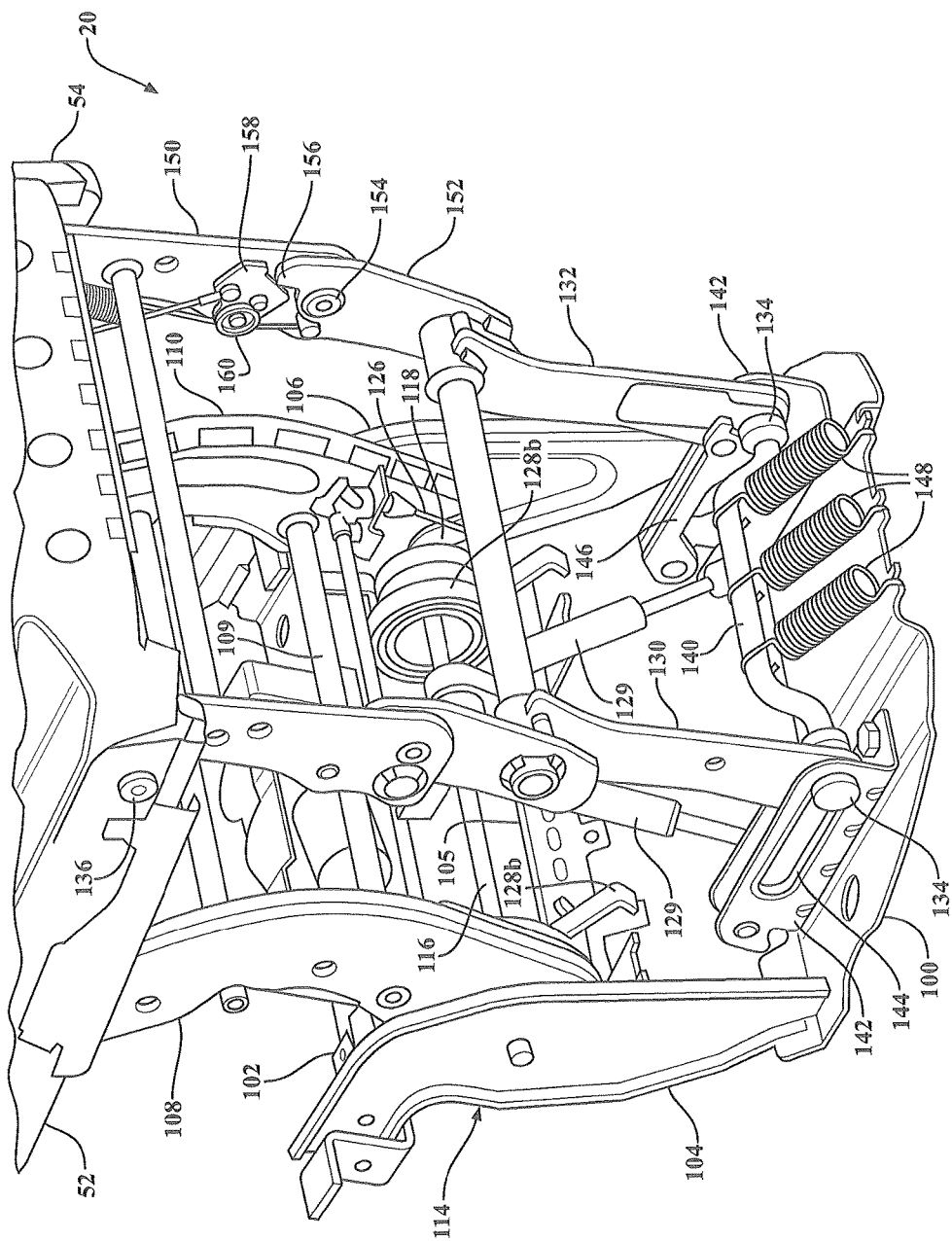
FIG. 10 is a fragmentary rear perspective view of a riser assembly according to an embodiment of the disclosure, in an upright position.
Figure 11:
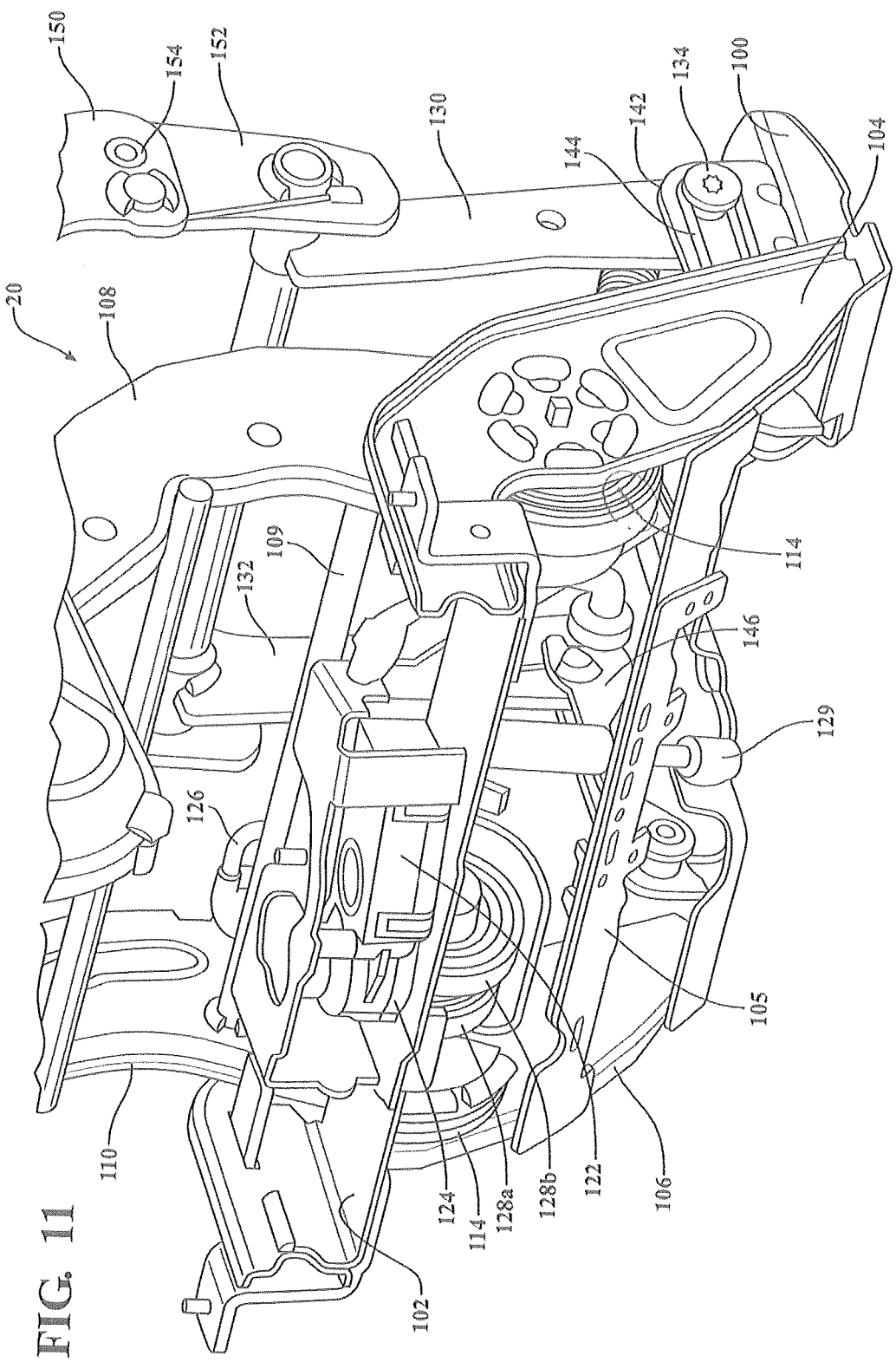
FIG. 11 is a fragmentary front perspective view of a riser assembly according to an embodiment of the disclosure.

Referring to FIGS. 10 and 11, the riser assembly 20 is shown including a front mounting plate 100 and a rear mounting plate 102 for fixedly mounting and securing the seat assembly 10 to the floor 18 of the vehicle. A pair of laterally spaced apart side support brackets 104, 106 are fixedly secured and extend between the front mounting plate 100 and rear mounting plate 102. A support bracket crossmember 105 extends laterally between and is fixedly secured to side support brackets 104, 106. A pair of rear legs 108, 110 extend between a first end pivotally coupled to the seat cushion side members 52, 54 by pivot posts 112 and a second end pivotally coupled to the side support brackets 104, 106 by a second disc recliner 114 separately operable between a locked and unlocked condition for allowing pivotal movement of the rear legs 108, 110 about the side support brackets 104, 106. A rear leg crossmember 109 extends laterally between and is fixedly secured to rear legs 108, 110. The second disc recliners 114 are interconnected by a second cross tube 116 for simultaneously actuating each of the second disc recliners 114 between the locked and unlocked conditions. A second cam lever 118 is operatively coupled to one of the second disc recliners 114 for actuating the second disc recliners 114 between a locked condition locking the rear legs 108, 110 in the upright position shown in FIG. 10 and an unlocked condition allowing the rear legs 108, 110 to pivot relative to the side support brackets 104, 106 for moving the seat 10 between the upright seating position, pitched easy entry position, and stowed position as will be described further hereinbelow.

Figure 12:
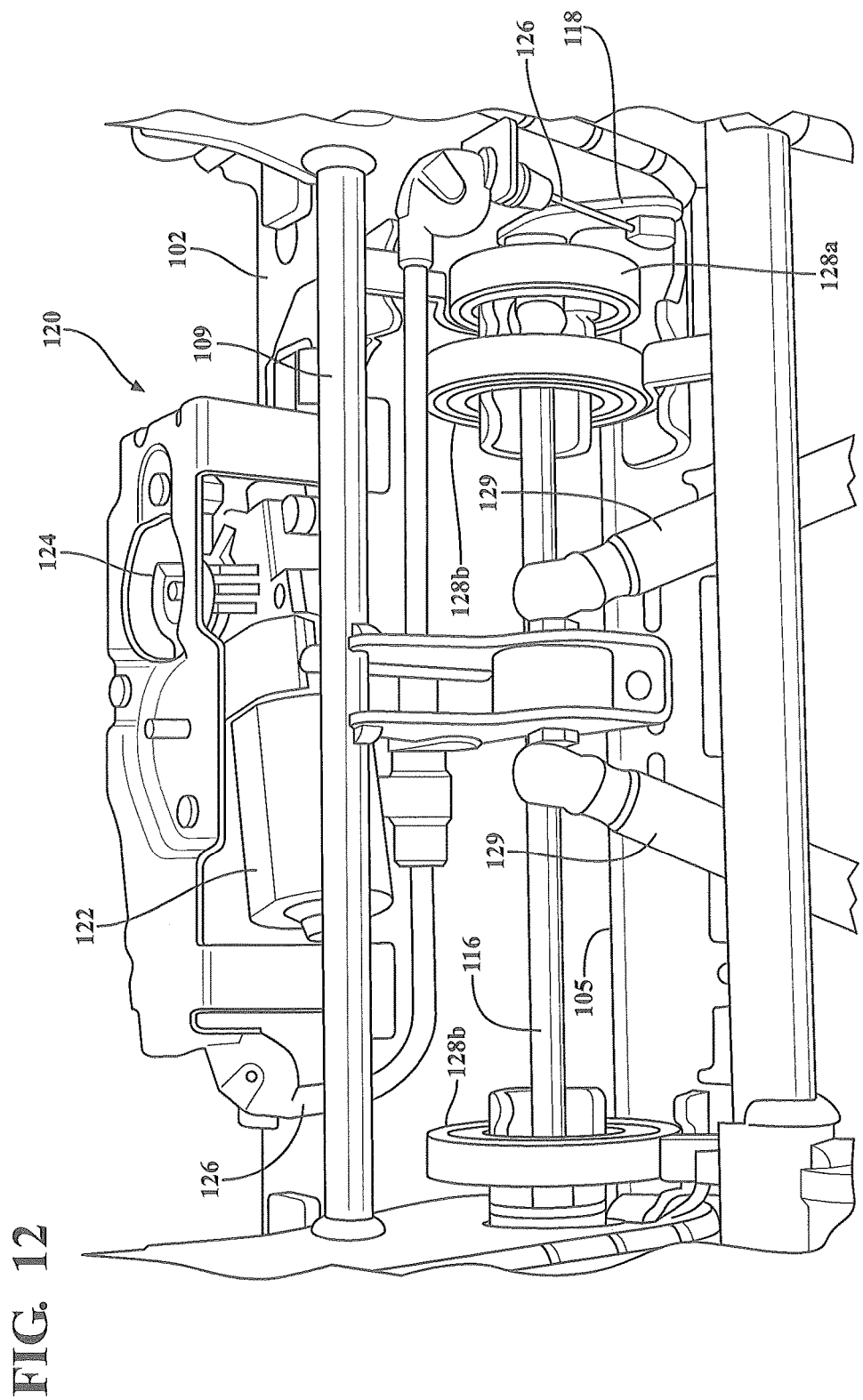
FIG. 12 is an enlarged fragmentary rear view of an electric drive assembly according to an embodiment of the disclosure.

Referring to FIGS. 11 and 12, an electric drive assembly 120 is coupled to the second cam lever 118 for actuating the second disc recliners 114 between the locked and unlocked conditions. The electric drive assembly 120 comprises an electric motor 122 coupled to a cable drum 124 for rotatably driving the cable drum 124 and pulling cable 126 connected to the second cam lever 118, thereby actuating the second disc recliners 114 between the locked and unlocked conditions in response to actuation of the electric drive assembly 120.

Figure 13:
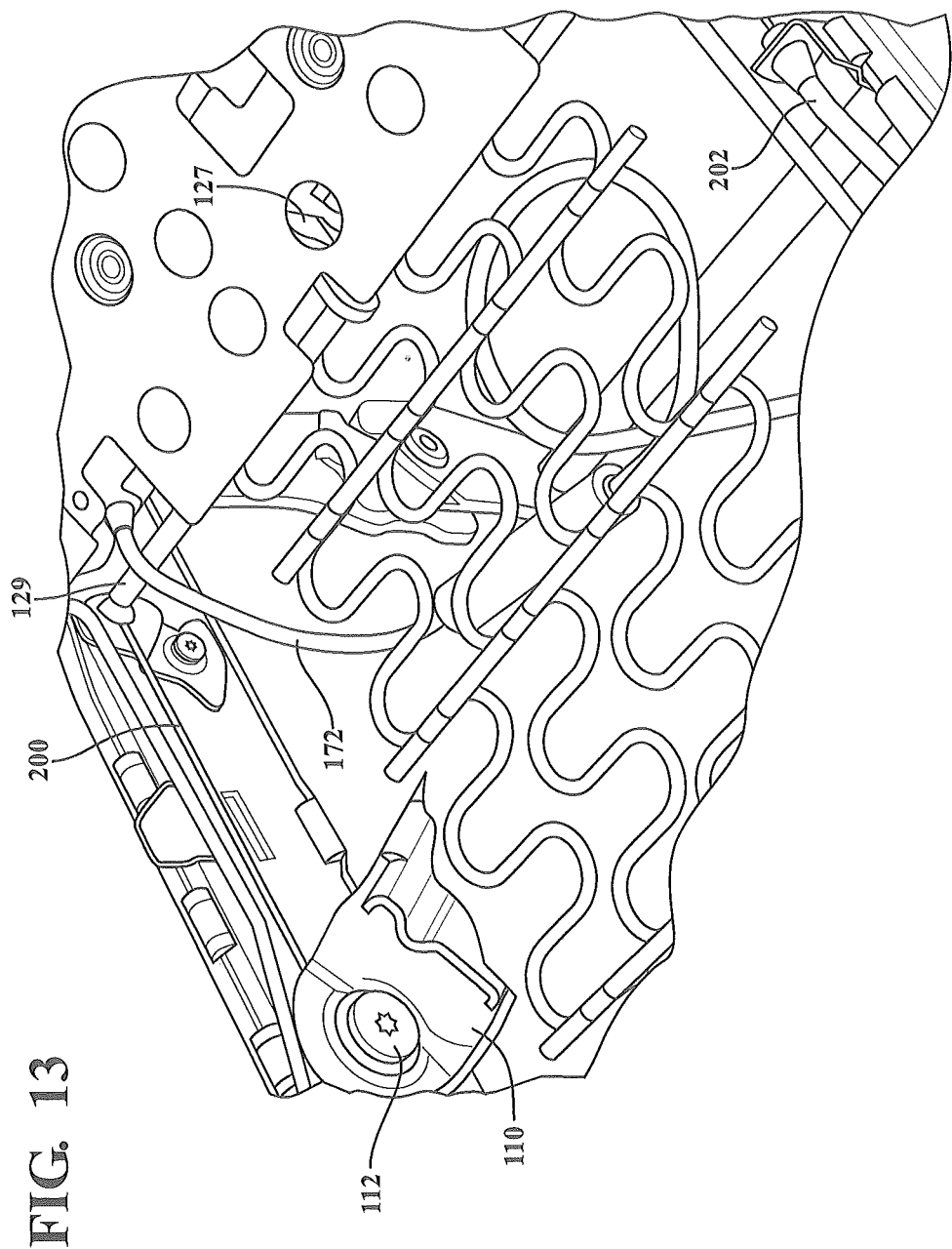
FIG. 13 is an enlarged fragmentary top perspective view of a seat cushion frame and riser assembly according to an embodiment of the disclosure.
Figure 14:
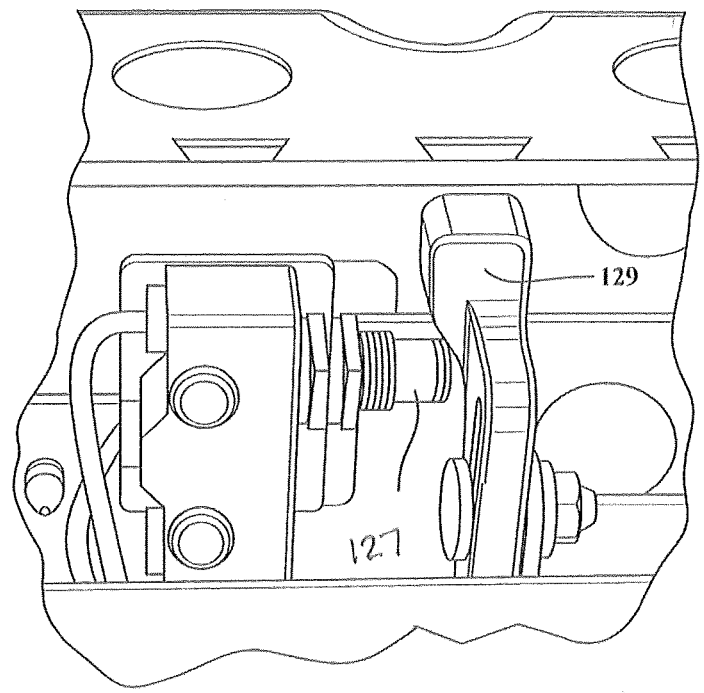
FIG. 14 is an enlarged fragmentary view of a riser assembly according to an embodiment of the disclosure.
Figure 15:
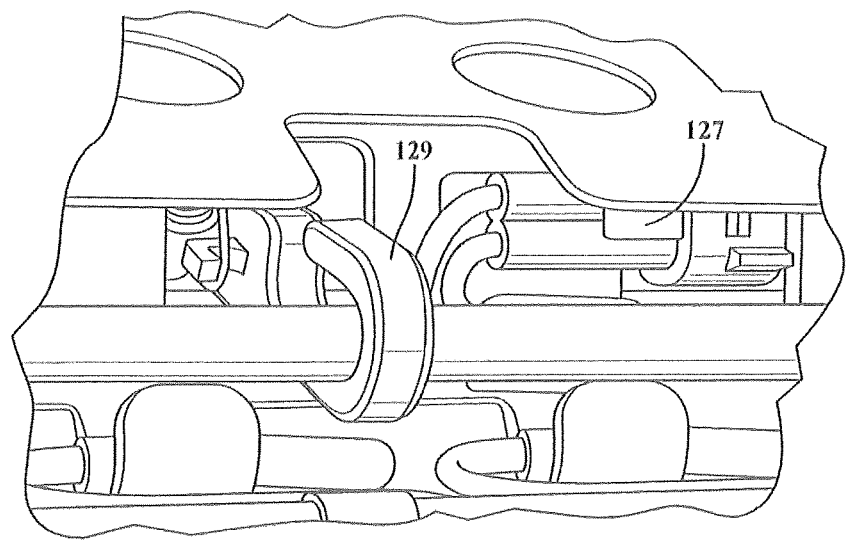
FIG. 15 is an enlarged fragmentary view of a seat cushion frame according to an embodiment of the disclosure.

Referring to FIGS. 13-15, a proximity switch 127 is fixedly secured to the bottom of the front cross member 56 of the seat cushion frame 50 for actuating the electric drive assembly 120. A switch actuator 129 is pivotally coupled between the side members 52, 54 for selectively engaging and actuating the proximity switch 127 to power the electric drive assembly 120 and actuate the second disc recliners 114 between the locked and unlocked conditions as will be described in greater detail herein below. Referring to FIGS. 10 and 12, a coil spring 128a is connected between at least one of the rear legs 108, 110 and the rear mounting plate 102 for biasing the rear legs 108, 110 to pivot forwardly and downwardly when the second disc recliners 114 are actuated to the unlocked condition. A pair of coil springs 128b are connected between the rear legs 108, 110 and the support bracket crossmember 105 for biasing the rear legs 108, 110 to pivot rearwardly and upwardly when the seat assembly 10 is moved from the stowed position to the upright seating position. A pair of pneumatic or hydraulic linear bias members 129 extend between one end coupled to the front mounting plate 100 and an opposite second end coupled to a bracket extending from the rear leg crossmember 109 for biasing the rear legs 108, 110 to pivot rearwardly and upwardly when the seat assembly 10 is moved from either the stowed position or pitched easy entry position to the upright seating position.

Referring again to FIG. 10, the riser assembly 20 also includes a pair of spaced apart front legs 130, 132 extending between a first end pivotally and slidably coupled to the front mounting plate 100 by lower pivot posts 134 and an opposite second end pivotally coupled to the side members 52, 54 of the seat cushion frame 50 by upper pivot posts 136. An upper cross tube 138 extends between the upper pivot posts 136 and is fixedly connected to the front legs 130, 132 to rotate with the front legs 130, 132. A lower cross tube 140 extends between the lower pivot posts 134 and also rotates with the posts 134 and front legs 130, 132. The front mounting plate 100 includes a pair of slide brackets 142 extending upwardly therefrom for receiving the lower pivot posts 134. Each slide bracket 142 includes an elongated slot 144 for slidably receiving and guiding the lower pivot posts 134 between a fore end and an aft end. A blocking arm 146 is pivotally connected to the slide bracket 142 for engaging the pivot post 134 to maintain the pivot post 134 in the fore end of the slot 144 with the seat assembly 10 in the upright seating position and release the pivot posts 134 to slide along the slot 144 to the aft end upon pivotal movement of the seat assembly 10 to the stowed position. A plurality of coil springs 148 extend between the lower cross tube 140 and the front bracket 100 for biasing the pivot posts 134 to the fore end of the slide brackets 142.

Figure 17:
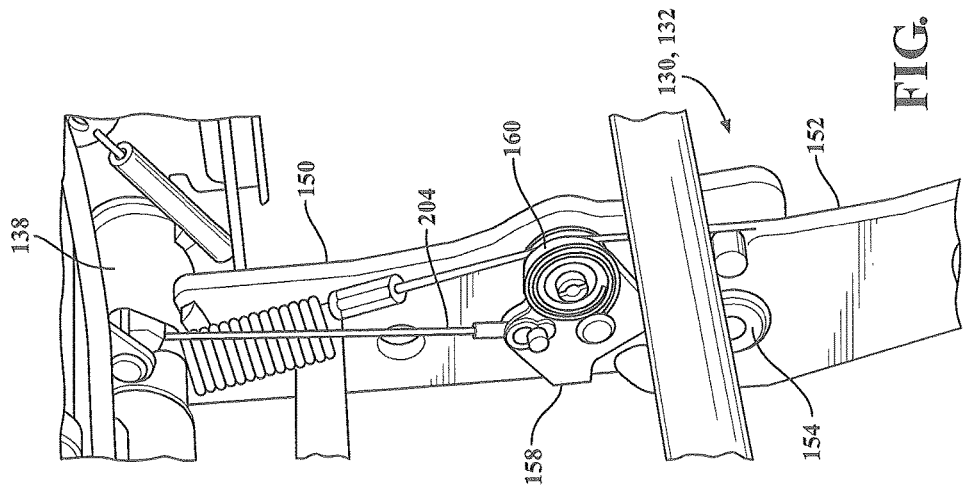
FIG. 17 is an enlarged fragmentary rear perspective view of a riser assembly according to an embodiment of the disclosure.
Figure 16:
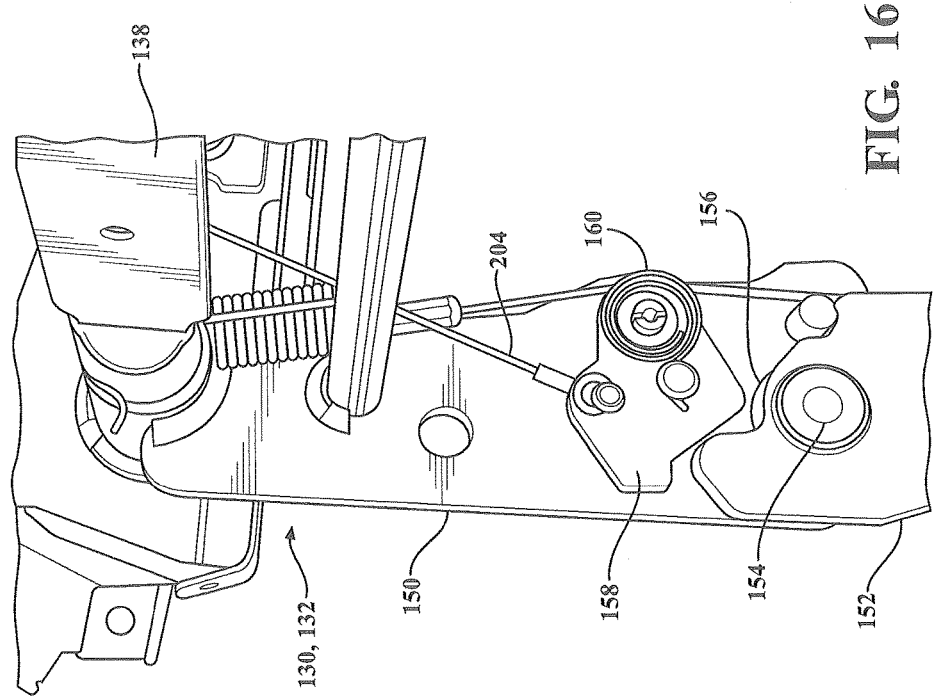
FIG. 16 is an enlarged fragmentary front perspective view of a riser assembly according to an embodiment of the disclosure.
Figure 19:
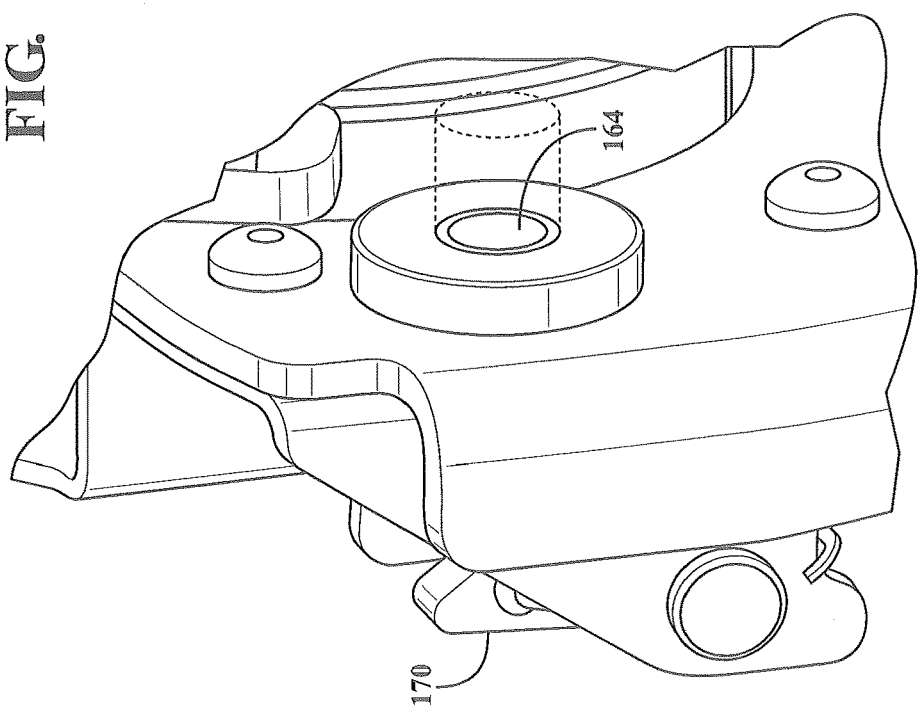
FIG. 19 is an enlarged fragmentary outboard perspective view of a seat back blocking mechanism according to an embodiment of the invention.
Figure 18:
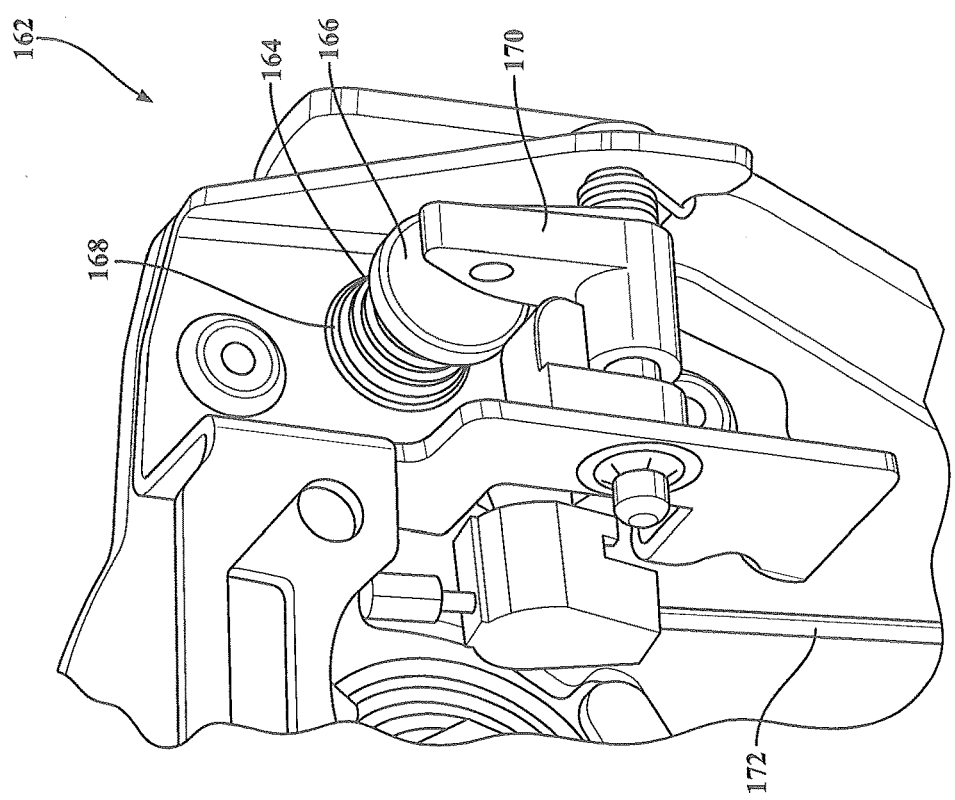
FIG. 18 is an enlarged fragmentary inboard perspective view of a seat back blocking mechanism according to an embodiment of the invention.

Referring to FIGS. 10, 16 and 17, the front legs 130, 132 comprise an upper leg portion 150 extending from the upper pivot posts 136 to an opposite distal end and a lower leg portion 152 extending from the lower pivot posts 134 to an opposite distal end. The respective distal ends of the upper and lower leg portions 150, 152 are pivotally interconnected by a pivot pin 154. The distal end of each lower leg portion 152 further includes a notch 156 formed therein. A latch arm 158 is pivotally coupled to the distal end of each upper leg portion 150 for locking engagement with the notch 156 between a latched position interlocking the upper and lower leg portions 150, 152 to prevent pivotal movement therebetween and an unlatched position decoupling and allowing pivotal movement of the upper leg portion 150 relative to the lower leg portion 152. A clock spring 160 is coupled to the latch arm 158 to bias the latch arm 158 to the latched position.

Referring to FIGS. 9a, 9b, 18 and 19, the seat assembly 10 further includes a seat back blocking mechanism 162 for blocking and preventing the seat back 14 from pivoting to the fold flat position when the seat assembly 10 is in the pitched easy entry position. Specifically, a retractable pin 164 is slidably coupled through an aperture in the lower bracket 72 of the recliner assembly 16. The pin 164 has a head 166 and a coil spring 168 seated around the pin 164 and compressed between the head 166 and the lower bracket 72 for biasing the pin 164 to a retracted position. A cam 170 is pivotally supported by the lower bracket 72 and engages with the head 166 of the pin 164 for actuating the pin 164 between the retracted position and an extended position pressed through the aperture in the lower bracket 72. A cable 172 extends between the upper cross tube 138 on the front legs 130, 132 and the cam 170 wherein the cable 172 is pulled in tension in response to rotation of the upper cross tube 138 with the pivoting movement of the front legs 130, 132 to the pitched easy entry position to pivot the cam 170 against the pin head 166, compressing the coil spring 168, and forcing the pin 164 to the extended position. In the extended position, the pin 164 is engaged by the upper bracket 70 of the recliner assembly 16 to block the seat back 14 from pivoting from the upright position to the fold flat position while the seat assembly 10 is in the pitched easy entry position.

In operation, the seat assembly 10 is selectively movable between the plurality of seating positions, fold flat position, pitched easy entry position or stowed position. First, referring to FIGS. 1, 3 and 8, the seat back 14 may be pivoted between one of the upright or reclined seating positions to the fold flat position by actuation of the recliner assembly 16. Specifically, actuation of the recliner handle 26 pivots the second recline link 94 about pivot post 96 in the clockwise direction, as shown in FIG. 8, pulling downwardly on the first recline link 86. The first recline link 86 pulls on the guide pin 92 to pivot the cam lever 80 in the counterclockwise direction and thereby releasing the disc recliner 74 to the unlocked condition and allowing pivotal movement of the seat back 14 relative to the seat cushion 12.

Alternatively, the seat assembly 10 is selectively movable between the seating position and the stowed position shown in FIG. 5 by actuating the rear stow strap 28. Referring again to FIG. 8, the stow recliner strap 28 is connected to the third recline link 87 pivotally coupled to the lower bracket 72. As the stow recliner strap 28 is pulled rearwardly, the third recline link 87 pivots in the counterclockwise direction pushing upwardly on the fourth recline link 95. The fourth recline link 95 rotates the cam lever 80 in the counterclockwise direction, thereby releasing the first disc recliner 74 to the unlocked condition and allowing pivotal movement of the seat back 14 to the fold flat position overlying the seat cushion 12. A cable 200 extends between third recline link 87 and the switch actuator 129 whereby pivotal movement of the third recline link 87 pulls on the cable 200 to pivot the switch actuator 129 into contact with the proximity switch 127. The contact and actuation of the proximity switch 127 actuates the electric motor 122 to drive the cable drum 124 and pull on the cable 126 to actuate the second disc recliners 114 to the unlocked condition. The coil spring 128a assists in pivoting the rear legs 108, 110 forwardly and downwardly moving the seat assembly 10 towards the bin 21. As the front legs 130, 132 pivot forwardly and downwardly, a protrusion on the lower leg portion 152 engages the blocking arms 146 to pivot and lift the blocking arms 146 upwardly and disengages them from the lower pivot posts 134 to allow the lower pivot posts to slide along the elongated slot 144 in the slide brackets 142 from the fore end to the aft end. This rearward translation of the front legs 130, 132 drops the seat assembly 10 downwardly while the rear legs 108, 110 pivot forwardly collapsing the seat assembly 10 into the bin 21 in the stowed position as shown in FIG. 5.

Figure 20:
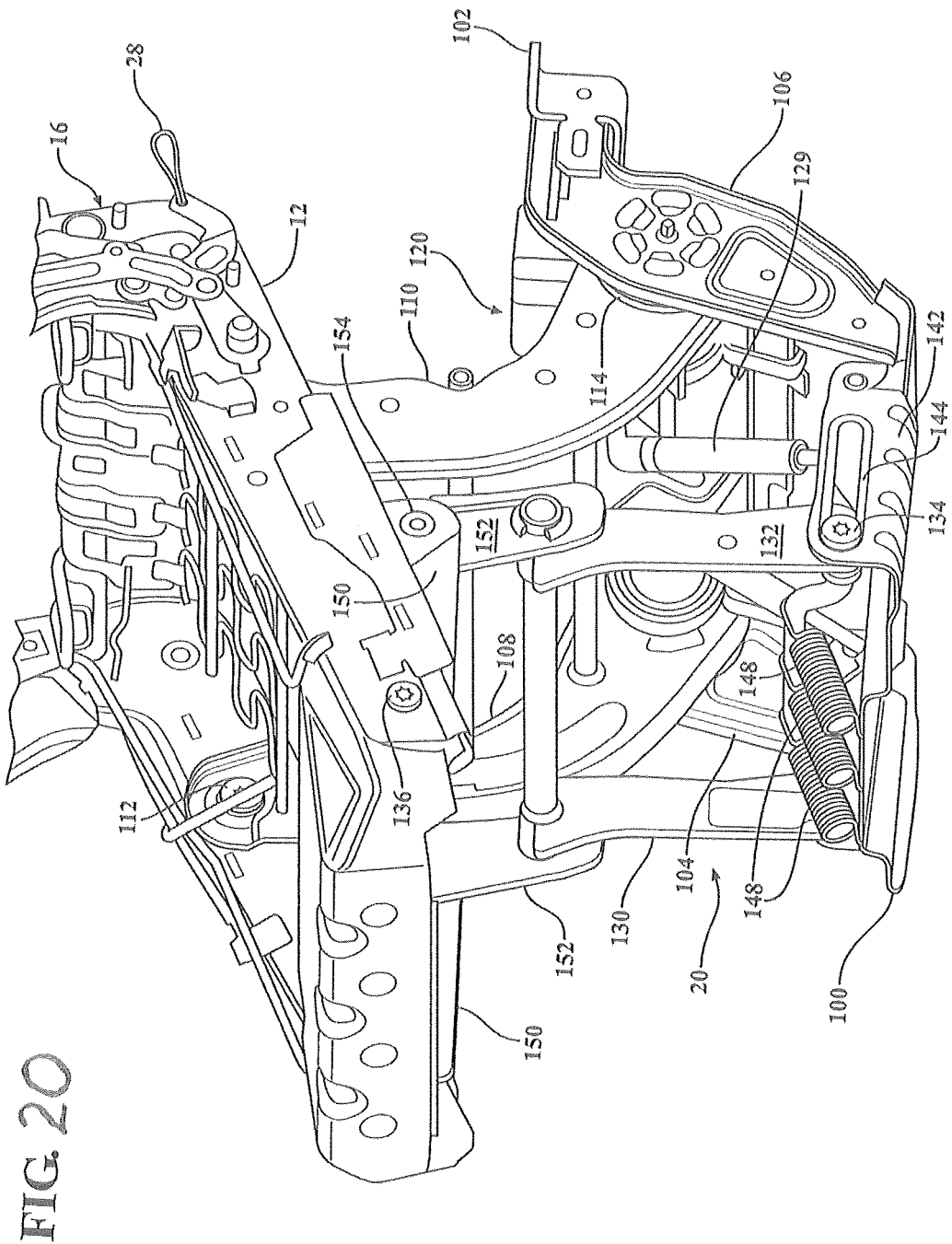
FIG. 20 is a fragmentary front perspective view of the seat assembly and riser assembly, in a pitched easy entry position, according to an embodiment of the present invention.

Finally, the seat assembly 10 is also selectively moveable between the seating position and the pitched easy entry position shown in FIGS. 4a and 4b by actuating an easy entry handle 31 operatively coupled to the upper portion of the seat back 14 as shown in FIG. 1. A cable 202 extends from the easy entry handle 31 to the switch actuator 129 whereby actuation of the handle 31 pulls on the cable 202 to pivot the switch actuator 129 into contact with the proximity switch 127. The contact and actuation of the proximity switch 127 actuates the electric motor 122 to drive the cable drum 124 and pull on the cable 126 to actuate the second disc recliners 114 to the unlocked condition. The coil spring 128a assists in pivoting the rear legs 108, 110 forwardly and downwardly moving the seat assembly 10 towards the bin 21. Cables 204 extend between the switch actuator 129 and the latch arms 158 on each leg 130, 132 whereby actuation and pivotal movement of the switch actuator 129 pulls on cables 204 and simultaneously pivots the latch arms 158 out of the notches 156 in the lower leg portion 152. With the latch arms 158 disengaged from the notches 156, the upper leg portions 150 are allowed to rotate about pivot pin 154 forwardly and downwardly relative to the lower leg portion 152 to tilt the seat assembly 10 downwardly to the pitched easy entry position as shown in FIG. 20. The lower leg portions 152 are prevented from rotating downwardly by interfacing with a vehicle load floor lid 21a for the bin 21. Further, as previously discussed, cable 172 extends between the upper cross tube 138 on the front legs 130, 132 and the cam 170 wherein the cable 172 is pulled in tension in response to rotation of the upper cross tube 138 with the pivoting movement of the upper leg portions 150 to the pitched easy entry position to pivot the cam 170 against the pin head 166, compressing the coil spring 168, and forcing the pin 164 to the extended position. In the extended position, the pin 164 is engaged by the upper bracket 70 of the recliner assembly 16 to block the seat back 14 from pivoting from the upright position to the fold flat position while the seat assembly 10 is in the pitched easy entry position. However it is possible to rotate the seat back 14 to the fold flat position first, and then put the seat in the pitched easy entry position via actuation of handle 31, as shown in FIG. 4b.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A seat assembly comprising:
    a seat cushion;
    a seat back;
    a recliner assembly pivotally coupling the seat cushion to the seat back, the recliner assembly operatively coupled to a recliner locking mechanism, the recliner locking mechanism selectively operable between a locked condition preventing pivotal movement of the seat back and an unlocked condition allowing pivotal movement of the seat back between at least two of a generally upright seating position, a reclined seating position, and a fold flat position;
    a riser assembly for supporting the seat assembly above a floor, the riser assembly operatively coupled to a riser locking mechanism, the riser locking mechanism configured for actuation and movement of the riser assembly between a generally upright seating position, a pitched easy entry position tilted forwardly and downwardly towards the floor to allow easier ingress and egress behind the seat assembly, and a stowed position recessed within a compartment below the floor; and
    a recliner strap operatively connected to the recliner locking mechanism and to the riser locking mechanism; whereby operation of the recliner strap unlocks the recliner locking mechanism and unlocks the riser locking mechanism, so as to permit the seat to be moved to the pitched easy entry position in which the seat back is in the fold flat position.

2. The seat assembly of claim 1, further comprising an easy entry handle operatively coupled to the riser locking mechanism whereby operation of the easy entry handle unlocks the riser locking mechanism while the recliner assembly locking mechanism remains in its locked condition, allowing the seat assembly to be moved to the pitched easy entry position in which the seat back is in the generally upright seating position.

3. The seat assembly of claim 1, further comprising a seat back blocking mechanism operatively connected to the recliner assembly to prevent the seat back from pivoting forward to the fold flat position when the riser assembly is in the pitched easy entry position.

4. The seat assembly of claim 1, further comprising a recliner strap operatively connected to the recliner locking mechanism and to the riser locking mechanism;
    whereby operation of the recliner strap unlocks the recliner locking mechanism and unlocks the riser locking mechanism, so as to permit the seat assembly to be moved to the stowed position recessed within the compartment below the floor in which the seat back is in the fold flat position.

5. The seat assembly of claim 1, further comprising an electric drive assembly operatively coupled to the riser locking mechanism actuating the riser locking mechanism between the locked and unlocked conditions.

6. The seat assembly of claim 5, further comprising a switch operatively connected to the electric drive assembly for selectively powering the electric drive assembly to actuate the riser locking mechanism between the locked and unlocked conditions.

7. A method of operating a seat assembly, the method comprising:
    providing a seat assembly comprising a seat cushion, a seat back, a recliner assembly pivotally coupling the seat cushion to the seat back, and a riser assembly for supporting the seat assembly above a floor;
    providing a recliner locking mechanism operatively coupled to the recliner assembly and selectively operable between a locked condition preventing pivotal movement of the seat back and an unlocked condition allowing pivotal movement of the seat back between at least two of a generally upright seating position, a reclined seating position, and a fold flat position;
    providing a riser locking mechanism operatively coupled to the riser assembly and selectively operable between a locked condition wherein the riser assembly is locked in a generally upright seating position preventing pivotal movement of the riser assembly and an unlocked condition allowing movement of the riser assembly between the generally upright seating position, a pitched easy entry position tilted forwardly and downwardly towards the floor to allow easier ingress and egress behind the seat, and a stowed position recessed within a compartment below the floor;
    providing a first seat assembly configuration wherein the seat back is in the generally upright seating position and the seat cushion is in a generally horizontal seating position with the riser assembly in the locked condition;
    providing a second seat assembly configuration wherein the seat back is in the reclined seating position and the riser assembly is in the locked condition;
    providing a third seat assembly configuration wherein the seat back is in the generally upright seating position and the riser assembly is in an unlocked position wherein the seat assembly is movable to the pitched easy entry position tilted forwardly and downwardly towards the floor to allow easier ingress and egress behind the seat;
    providing a fourth seat assembly configuration wherein the seat back is folded down on the seat cushion and the riser assembly is rotated forward and downward to the stowed position recessed within the compartment below the floor; and providing a recliner strap operatively connected to the recliner locking mechanism and to the riser locking mechanism;

operating the recliner strap which unlocks the recliner locking mechanism and unlocks the riser locking mechanism; and moving the seat assembly to the pitched easy entry position in which the seat back is in the fold flat position.

8. The method of claim 7, the method further comprising:
positioning the recliner locking mechanism in the unlocked condition;
rotating the seat back into the fold flat position;
positioning in the riser locking mechanism in the unlocked condition; and
moving the riser assembly into the stowed position recessed within the compartment below the floor.

9. The method of claim 7, the method further comprising:
positioning the seat back in the generally upright seating position;
positioning the recliner locking mechanism in the locked condition;
positioning in the riser locking mechanism in the unlocked condition; and
moving the riser assembly to the pitched easy entry position tilted forwardly and downwardly towards the floor to allow easier ingress and egress behind the seat.

10. A method of operating a seat assembly, the method comprising:
providing a seat assembly comprising a seat cushion, a seat back, a recliner assembly pivotally coupling the seat cushion to the seat back, and a riser assembly for supporting the seat assembly above a floor;
providing a recliner locking mechanism operatively coupled to the recliner assembly and selectively operable between a locked condition preventing pivotal movement of the seat back and an unlocked condition allowing pivotal movement of the seat back between at least two of a generally upright seating position, a reclined seating position, and a fold flat position;
providing a riser locking mechanism operatively coupled to the riser assembly and selectively operable between a locked condition wherein the riser assembly is locked in a generally upright seating position preventing pivotal movement of the riser assembly and an unlocked condition allowing movement of the riser assembly between the generally upright seating position, a pitched easy entry position tilted forwardly and downwardly towards the floor to allow easier ingress and egress behind the seat, and a stowed position recessed within a compartment below the floor;
providing a first seat assembly configuration wherein the seat back is in the generally upright seating position and the seat cushion is in a generally horizontal seating position with the riser assembly in the locked condition;
providing a second seat assembly configuration wherein the seat back is in the reclined seating position and the riser assembly is in the locked condition;
providing a third seat assembly configuration wherein the seat back is in the generally upright seating position and the riser assembly is in an unlocked position wherein the seat assembly is movable to the pitched easy entry position tilted forwardly and downwardly towards the floor to allow easier ingress and egress behind the seat;
providing a fourth seat assembly configuration wherein the seat back is folded down on the seat cushion and the riser assembly is rotated forward and downward to the stowed position recessed within the compartment below the floor; and
providing a recliner strap operatively connected to the recliner locking mechanism and to the riser locking mechanism;
operating the recliner strap which unlocks the recliner locking mechanism and unlocks the riser locking mechanism;
moving the seat back is in the fold flat position; and
moving the riser assembly into the stowed position recessed within the compartment below the floor.

\* \* \* \* \*